(12) United States Patent
Hodge

(10) Patent No.: US 11,354,959 B2
(45) Date of Patent: *Jun. 7, 2022

(54) SYSTEM AND METHOD FOR REMOTE MONITORING OF RELEASED INDIVIDUAL

(71) Applicant: **Global Tel*Link Corporation**, Reston, VA (US)

(72) Inventor: Stephen Lee Hodge, Aubrey, TX (US)

(73) Assignee: **Global Tel* Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,558

(22) Filed: Oct. 19, 2020

(65) Prior Publication Data

US 2021/0104109 A1 Apr. 8, 2021

Related U.S. Application Data

(63) Continuation of application No. 16/725,599, filed on Dec. 23, 2019, now Pat. No. 10,810,818, which is a
(Continued)

(51) Int. Cl.
*G08B 1/08* (2006.01)
*G07C 9/27* (2020.01)
*H04L 9/12* (2006.01)
*H04B 5/00* (2006.01)
*G08B 1/00* (2006.01)
(Continued)

(52) U.S. Cl.
CPC ............... *G07C 9/27* (2020.01); *G07C 9/28* (2020.01); *G08B 1/00* (2013.01); *H02J 50/00* (2016.02); *H04B 5/0037* (2013.01); *H04B 5/0056* (2013.01); *H04L 9/12* (2013.01)

(58) Field of Classification Search
CPC .. G07C 9/27; G07C 9/28; H02J 50/00; G08B 1/00; H04B 5/0037; H04B 5/0056; H04L 9/12
See application file for complete search history.

(56) References Cited

U.S. PATENT DOCUMENTS 8,260,323 B1 * 9/2012 Bronner ................ H04W 4/029
455/456.6
8,862,152 B1 * 10/2014 Buchholz ............... G08B 21/02
455/456.1
(Continued)

*Primary Examiner* — Munear T Akki
(74) *Attorney, Agent, or Firm* — Sterne, Kessler, Goldstein & Fox P.L.L.C.

(57) ABSTRACT

A system and method are disclosed for activating remote monitoring functionality of a personal wireless device associated with a released individual. After incarceration, former inmates are released under a variety of different circumstances, many of which require follow-up check-ins with case managers or other individuals. As part of their release, inmates often agree to multiple restrictions and requirements. In order to better monitor compliance with those requirements, a personal wireless device assigned to the released individual can be programmed with certain rules and automatically trigger when a violation is detected. As a result of a detected violation, the personal wireless device activates certain devices, such as a camera, microphone, etc., to capture data in order to remotely monitor the released individual. A case manager can also manually activate monitoring.

16 Claims, 5 Drawing Sheets

Related U.S. Application Data continuation of application No. 15/783,607, filed on Oct. 13, 2017, now Pat. No. 10,515,494.

(51) Int. Cl.
   *H02J 50/00* (2016.01)
   *G07C 9/28* (2020.01)

(56) References Cited

U.S. PATENT DOCUMENTS

| | | | |
|---|---|---|---|
| 10,068,398 B1 * | 9/2018 | Hodge | G08B 21/0277 |
| 10,515,494 B2 | 12/2019 | Hodge | |
| 10,810,818 B2 | 10/2020 | Hodge | |
| 2005/0068169 A1 * | 3/2005 | Copley | G08B 21/0283 |
| | | | 340/539.13 |
| 2006/0197658 A1 * | 9/2006 | Light | G08B 13/2417 |
| | | | 340/539.23 |
| 2007/0103301 A1 | 5/2007 | Bowman et al. | |
| 2007/0103303 A1 | 5/2007 | Shoarinejad | |
| 2007/0167139 A1 | 7/2007 | Inano et al. | |
| 2009/0224909 A1 * | 9/2009 | Derrick | G01S 5/0027 |
| | | | 340/539.13 |
| 2011/0291803 A1 | 12/2011 | Bajic et al. | |
| 2011/0304441 A1 | 12/2011 | Roesner | |
| 2012/0094598 A1 * | 4/2012 | Tysowski | G06Q 20/3224 |
| | | | 455/41.1 |
| 2013/0121658 A1 * | 5/2013 | Kiet | H04N 21/4223 |
| | | | 386/224 |
| 2015/0271777 A1 * | 9/2015 | Torgersrud | H04W 12/08 |
| | | | 455/456.3 |
| 2016/0042214 A1 | 2/2016 | Barack | |
| 2016/0267770 A1 * | 9/2016 | Keays | G08B 25/08 |
| 2016/0309122 A1 * | 10/2016 | Kingery | G06K 9/00892 |
| 2017/0162031 A1 * | 6/2017 | Drolshagen | G06K 9/00892 |
| 2018/0365779 A1 * | 12/2018 | Hodge | G06Q 50/26 |
| 2018/0365966 A1 * | 12/2018 | Hodge | G08B 21/22 |

* cited by examiner

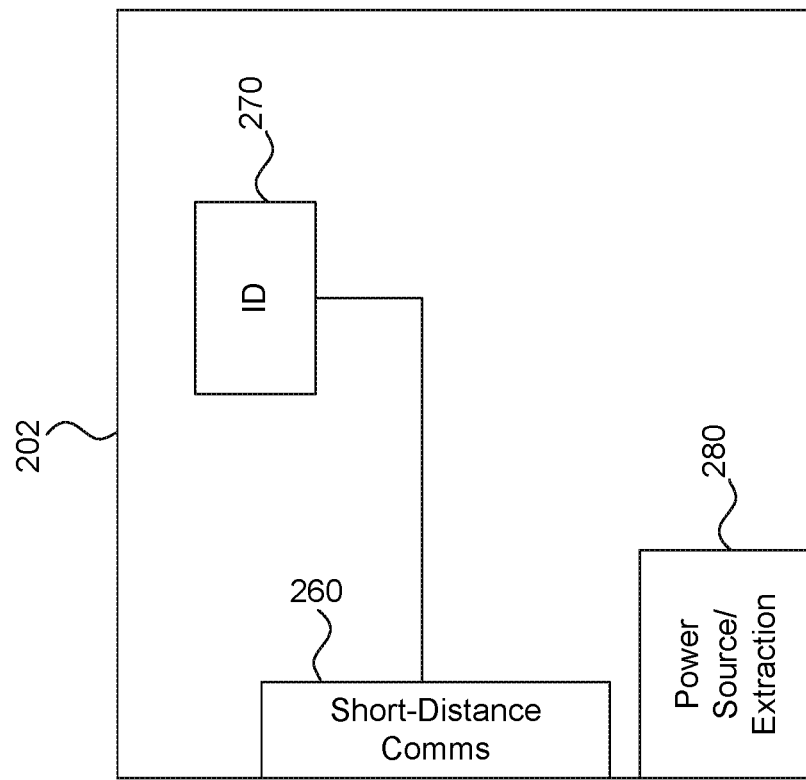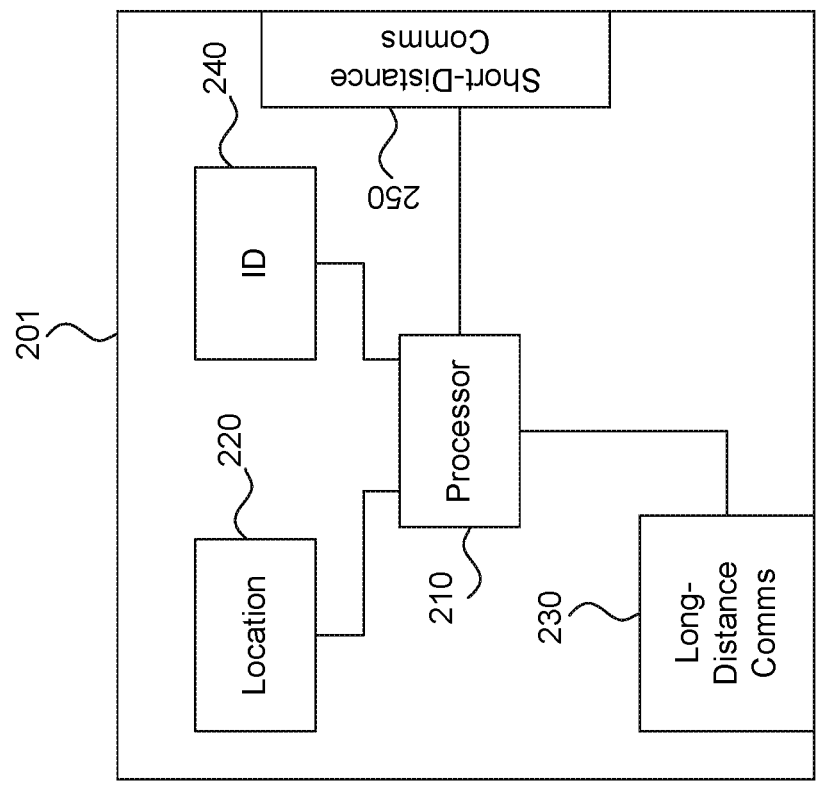
FIG. 2

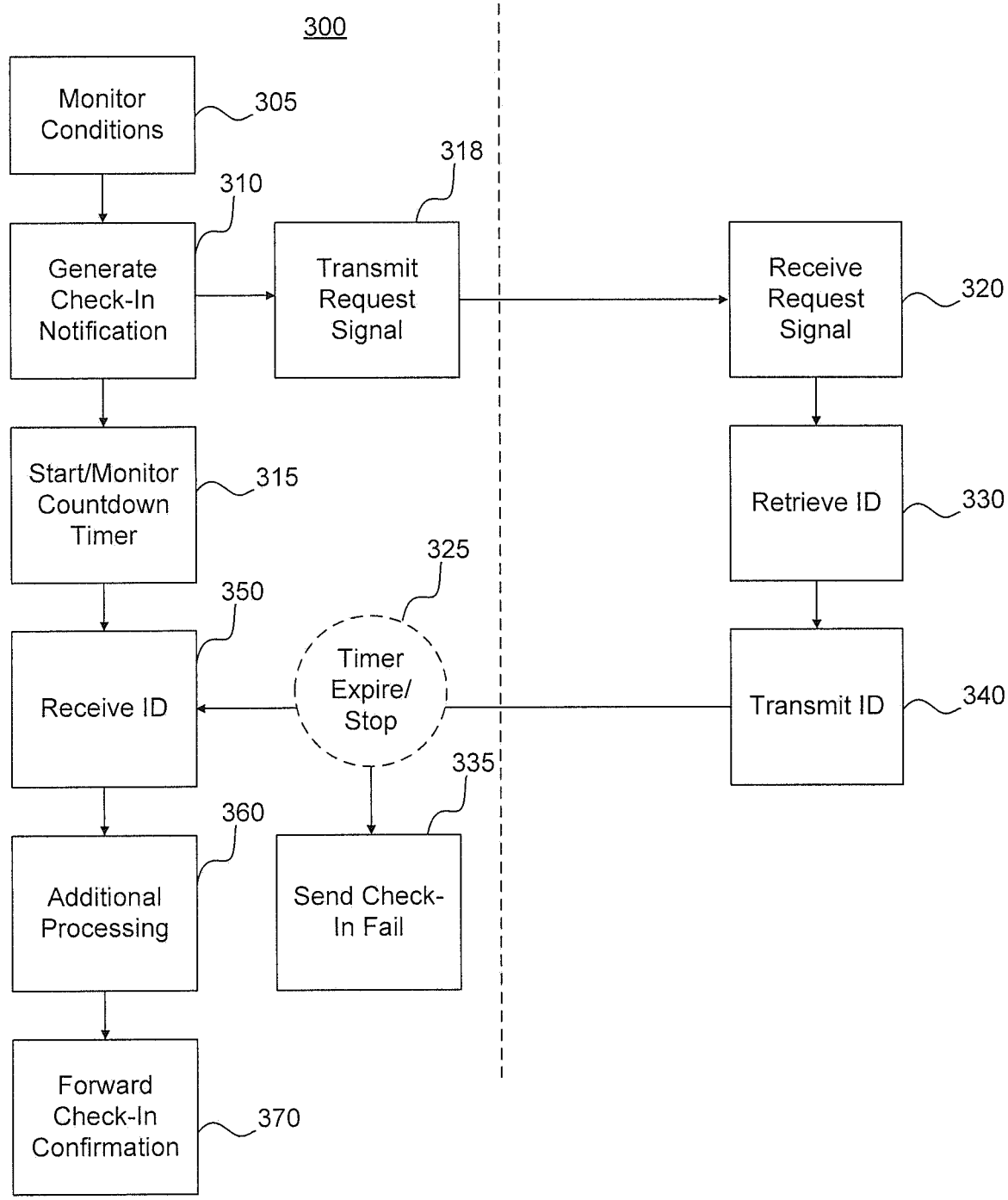

SYSTEM AND METHOD FOR REMOTE MONITORING OF RELEASED INDIVIDUAL

CROSS-REFERENCE TO RELATED APPLICATIONS

This application is a Continuation Application of U.S. patent application Ser. No. 16/725,599, filed Dec. 23, 2019, which is a Continuation Application of U.S. patent application Ser. No. 15/783,607, filed Oct. 13, 2017, both of which are incorporated by reference herein in their entireties.

BACKGROUND

Field

The disclosure relates to systems and methods for tethering a device with an individual.

Background

After incarceration, an individual is often released under a trial status. Under this trial status, the released individual is subject to numerous restrictions and rules. As part of their release, a communication device may be assigned to the individual. The communication device is used for a variety of different reasons, such as monitoring the individual's location, receiving mandatory check-ins from the individual, etc. Conventionally, the device was issued by the releasing correctional institution, and in order to carry out the check-ins, the released individual would be charged for a wireless plan on a wireless carrier.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

FIG. 2 illustrates a block diagram of an exemplary tethering system according to an embodiment of the disclosure.

FIG. 3A illustrates a portion of the method of FIG. 3 that is performed by a personal wireless communication device according to an embodiment of the disclosure.

FIG. 3B illustrates a portion of the method of FIG. 3 that is performed by a fixed device according to an embodiment of the disclosure.

Figure 1:
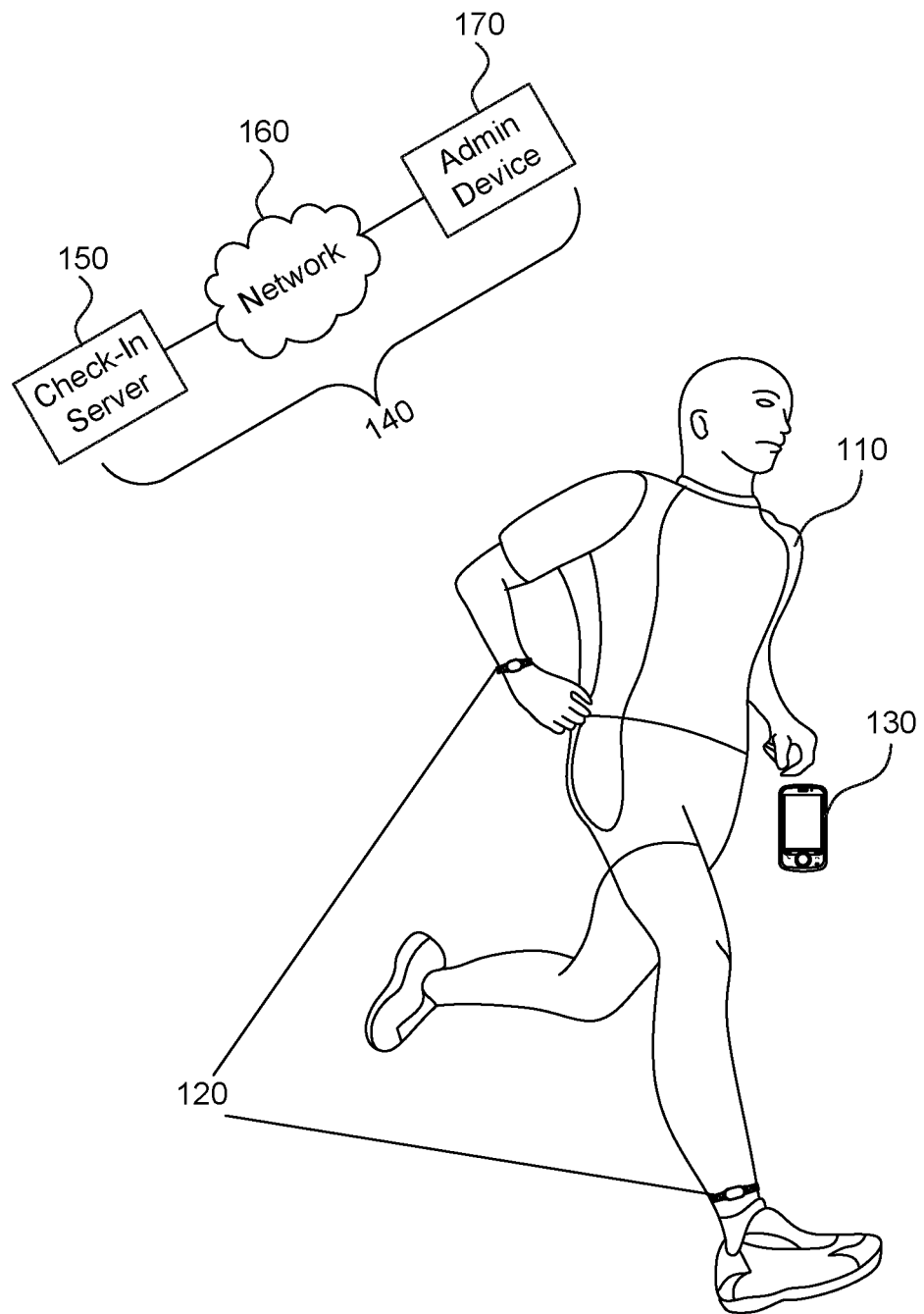
FIG. 1 illustrates a perspective view of an exemplary tethering environment according to an embodiment of the disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," and the like, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, and the like), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, and the like. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

As discussed above, when an inmate is released from custody (e.g., prison), that person must often consent to certain monitoring and/or check-in requirements. As part of that agreement, the released individual may be required to stay within certain geographical locations, call in to a case worker periodically, confirm their location, etc. Conventionally, the released individual would be outfitted with a fixed device that would be affixed to their person, such as around their wrist or ankle. The fixed device would have its own power source, as well as its own long-range communication capabilities. More recently, in order to circumvent the requirements of having a very specialized device, facilities have begun to issue released individuals with a specially configured wireless communication device, such as a cellular telephone or tablet device. The released individual would be able to carry out their check-in and location certification requirements via the assigned device.

However, because each of the conventional solutions must be capable of communicating over the cellular network, each requires its own wireless carrier plan. This adds significant cost to a released individual who is often very low on liquid finances. Further, because these devices are specialized they often cannot replace the individual's personal device. Thus, the released individual must pay for and carry two wireless devices. This is not a financially sound solution for a recently-released individual.

Therefore, there is a need for a monitoring solution that does not require a separate wireless carrier service plan.

Monitoring Environment

FIG. 1 illustrates a perspective view of an exemplary tethering environment 100 according to an embodiment of the disclosure. In the environment, the released individual 110 is outfitted with a fixed device 120 and his own personal wireless communication device 130. Unlike conventional systems, the personal wireless communication device 130 is not issued by the facility, government, or other monitoring agency, but rather is purchased and maintained by the inmate. As such, the personal wireless communication device 130 functions as the released individual's device for personal use.

The fixed device 120 is affixed to the user in any number of ways. The fixed device 120 can be an ankle or wrist bracelet, which locks in place. Alternatively, the fixed device 120 may be implanted underneath the skin. The fixed device 120 is locked onto the released individual's person so that it cannot be easily removed without significant effort. Form factors already exist for fixed devices, and are generally acceptable for the present application.

In operation, the personal wireless communication device 130 is configured with software to carry out the check-in procedures. Through that software, the personal wireless communication device 130 carries out the functions associated therewith as described herein. The personal wireless communication device 130 monitors one or more conditions, such as the passage of time, the location, etc. When one of the conditions is satisfied, the personal wireless communication device 130 issues a notification to the released individual. In an embodiment, the notification is a textual notification, and is accompanied by an audible, vibrating, or other alert.

In response to the alert and the notification, the released individual is provided with an opportunity to transmit the required check-in information. In an embodiment, the released individual must perform the check-in requirement within a predetermined time. After the predetermined time has elapsed without a response, the personal wireless communication device 130 communicates a "Check-In Failed" signal to the check-in system 180.

Alternatively, in response to the alert and notification, the released individual 110 moves the personal wireless communication device 130 within close proximity of the fixed device 120. The proximity causes the fixed device to activate and respond with stored encoded identity data. The personal wireless communication device 130 receives the identity data, confirms that it is associated with the released individual, and then transmits the check-in signal to the check-in system 180.

As shown in FIG. 1, the check-in system 180 includes the check-in server 150 and an administrator device 170 connected via a network 160. The check-in signals and check-in failure signals sent from the personal wireless communication device 130 are received at the check-in server and processed therein. The processing may include storing the signals, generating reports, statistics, etc., and generating a notification signal for forwarding the check-in information to the administrator device 170 via the network 160. In this manner, a case manager or other administrator may oversee the check-ins of the released individual 110.

FIG. 2 illustrates a block diagram of an exemplary tethering system 200 according to an embodiment of the disclosure. The tethering system 200 includes the personal wireless communication device 201 and the fixed device 202.

The personal wireless communication device 201 includes a processor 210, Location 220, Long-distance communication 230, short-distance communication 250, and ID 240, and may represent an exemplary embodiment of the personal wireless communication device 130.

In the personal wireless communication device 201, the location 220 is configured for determining a location of the personal wireless communication device 201. In an embodiment, the location 220 is a GNSS receiver that receives GNSS signals from one or more GNSS satellites. Using conventional GPS location determination methods, the location 220 determines a location of the device 201. In other embodiments, the location 220 may carry out triangulation methods based on signals received from a plurality of wireless base stations or other access points, and/or includes force detection mechanisms (e.g., an accelerometer) for detecting spatial motion of the personal wireless communication device 201.

Long-distance communication 230 includes a radio or other wave generator for transmitting modulating data signals over an air interface. In various embodiments, the long-distance communication 230 is configured to communicate over any of several different wireless communication standards, including 2G, 3G, LTE, etc.

Short-distance communication 250 is designed for communicating with a nearby fixed device, and thus does not require the same power consumption as the long-distance communication 230. Thus, the short-distance communication 250 is any device and/or circuit capable of wirelessly transmitting over short distances, including Bluetooth, Infrared, Near-Field Communication. In another embodiment, the short-distance communication 250 is a wired communication port designed to communicate using USB or Internet protocols.

The ID 240 includes one or more memory banks for storing the ID of the released individual. This ID is the same as an ID stored on the fixed device 202, as will be discussed in further detail below. In an embodiment, the ID is stored encrypted. Processor 210 coordinates the functionality amongst the other circuits, and facilitates the communication and check-in functionality. The details of the processor will be described below with respect to the system operation.

The fixed device 202 requires much simpler construction than the personal wireless communication device 201, as it does not require large amounts of processing power or long-distance communication capabilities. Thus, the fixed device 202 includes a short-distance communicator 260, an ID 270, and a power source/power extraction 280, and may represent an exemplary embodiment of the fixed device 120.

The short-distance communicator has a similar construction to that of short-distance communication 230, and is configured for communicating using any short-range communication standard, such as Bluetooth, Infrared, or Near-Field communication. In an embodiment, the short-distance communicator 260 is a wired port connection that communicates over USB or Internet Protocol. The ID 270 includes one or more memory banks that store the unique ID of the inmate. In an embodiment, the ID is stored encrypted. In this embodiment, either the ID 270 or a separate decryptor (not shown) includes circuitry for carrying out decryption of the ID before transmission, as described below.

The fixed device 202 also includes a power source 280. In an embodiment, the power source 280 is configured to extract power from the personal wireless communication device 201 through the interaction therewith. For example, the power source 280 can be configured to extract power from Near-Field communication modulation. When the short-distance communications 250 and 260 are configured to communicate using NFC (Near-Field Communication), then the power source 280 can extract the power from the exchanged signals as part of that communication. Alternatively, if the short-distance communications 250 and 260 are configured to communicate using a different short-range communication standard, then the power source 280 may be configured to sync with a power transfer coil of the personal wireless communication device 201 for purposes of performing independent power extraction using NFC.

In other embodiments, the fixed device 202 can be configured as a passive radio frequency identification tag. In this embodiment, the power source 280 receives power from the personal wireless communication device 201, which has RFID capabilities. The fixed device 201 is "energized" by the personal wireless communication device 201 in order to provide the requested information. In another embodiment, the power source 280 receives power directly from the personal wireless communication device 201 over a wired connection. Such power can be transferred using any number of available standards, including USB. In still another embodiment, the power source 280 is self-powering, such as by taking the form of a battery, kinetically charged capacitor, etc. When configured with a battery, the battery can be either replaceable or rechargeable. Additionally, the battery can be replaceable and/or chargeable. When chargeable, the battery is able to be charged via any of the power transfer options described herein.

In operation, the processor 210 of the personal wireless communication device 210 monitors one or more conditions, such as time, location, etc. In an embodiment, the personal wireless communication device 201 is also capable of receiving a check-in instruction from an external device, such as the administrator device 170. Such instruction is received via the long-distance communication 230, and functions as another condition. Upon a condition being satisfied, the processor causes a check-in notification to be provided to the user. As discussed above, the notification is displayed and/or audible. The processor 210 then starts a countdown timer within which the user must perform the check-in procedure. The countdown timer should be long enough to allow compliance, but short enough to prevent fraudulent behavior. In an embodiment, the user is given two minutes to respond.

During the allotted time period, the user of the personal wireless communication device 201 moves the device 201 within close proximity of the fixed device 202. In an embodiment, the user presses a button on the personal wireless communication device in order to initiate the check-in procedure once the device 201 has been moved near the fixed device 202. The processor 210 receives the initiation instruction and causes the short-distance communication 250 to transmit the request signal to the fixed device. The request signal may take a variety of forms depending on the communication standard being employed.

At the fixed device 202, the power source 280 provides power to the other components in any of the manners described hereinabove. The short-distance communicator receives the request signal from the personal wireless communication device 201. In response to the request signal, the short-distance communicator retrieves the released individual's unique ID 270 from the ID memory 270, and then transmits the retrieved information back to the personal wireless communication device 201 via the short-distance communicator 260.

In an embodiment, the ID is transmitted in encrypted form to be decrypted at the personal wireless communication device 201. This further marries the fixed device 202 to the personal wireless communication device 201.

The personal wireless communication device 201 receives the ID and, if necessary, decrypts the ID. The processor 210 then retrieves the ID stored in the local memory 240, and compares the stored ID with the ID received from the fixed device 202. If the IDs match, then the check-in process has been successful. As a result, the processor 210 generates a check-in signal and causes the long-distance communication 230 to transmit the check-in signal to the check-in server 150. In an embodiment, the check-in signal includes additional information for logging purposes, such as time of check-in, location, duration, etc.

On the other hand, if the IDs do not match, or if no successful response is received within the countdown timer, the processor 210 determines that check-in has failed. The processor 210 then generates a Check-In Fail message, and causes the long-distance communication 230 to transmit the message to the check-in server 150.

The check-in server 150, upon receiving the check-in signal and/or the Check-In Fail message, notifies the administrator device 170 of the event via the network 160.

Power Transfer

As discussed above, in certain embodiments, the fixed device 202 may receive power in a variety of different ways.

Figure 4A:
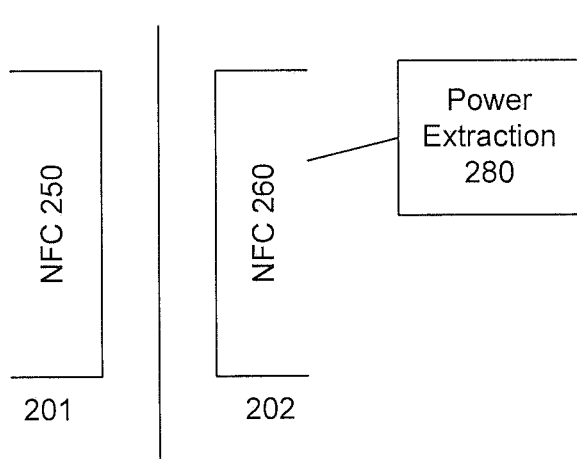
FIG. 4A illustrates a block diagram of an exemplary power transfer system of the exemplary tethering system according to an embodiment of the disclosure.
Figure 4B:
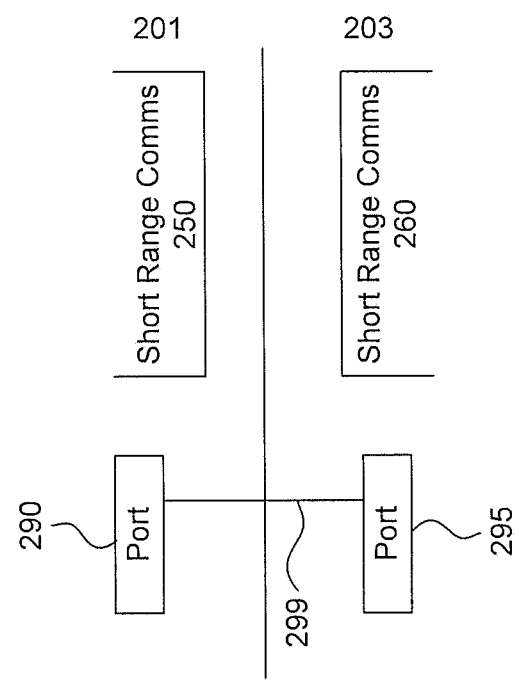
FIG. 4B illustrates a block diagram of an exemplary power transfer system of the exemplary tethering system according to an embodiment of the disclosure.
Figure 4C:
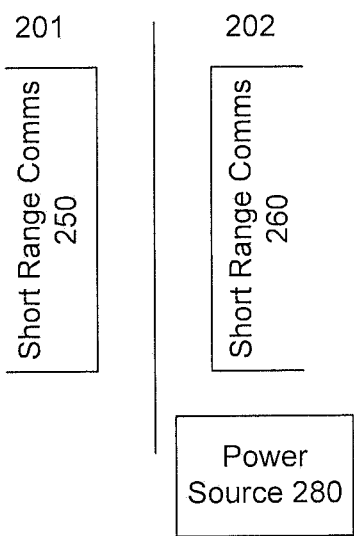
FIG. 4C illustrates a block diagram of an exemplary power transfer system of the exemplary tethering system according to an embodiment of the disclosure.

FIGS. 4A-4C depict block diagrams of different power configurations of the fixed device 202.

As shown in FIG. 4A, the personal wireless communication device 201 and the fixed device 202 communicate via NFC. Thus, each includes NFC transceivers 250/260, respectively. In this configuration, the power source 280 of the fixed device 202 is a power extractor 280 that extracts power from the near-field communication signals.

In an alternative embodiment, shown in FIG. 4B, the power source 280 of the fixed device is a wired electrical port 295. The wired port 295 of the fixed device 202 connects to a similar port 290 at the personal wireless communication device 201 via a wire connection 299. This wired connection can operate under any available wired communication and/or power transfer standard, such as USB. The port 295 receives power via the wired connection. In an embodiment, data may also be transferred over the connection, which may render the short-range communicators 250/260 unnecessary.

In another embodiment, shown in FIG. 4C, the fixed device 202 is supplied with a simple power source, such as a battery, kinetically-charged capacitor, or other power source. In this embodiment, no modifications are needed to either of the personal wireless communication device 201 or the fixed device 202.

Method of Implementation

FIGS. 3A and 3B illustrate a flowchart diagram of an exemplary tethering method 300 according to an embodiment of the disclosure. The method of FIGS. 3A and 3B will be described with respect to the elements of FIGS. 1 and 2, where necessary. For discussion purposes, the method of FIGS. 3A and 3B is broken into FIG. 3A (left side) that is performed by the personal wireless communication device 201, and FIG. 3B (right side) that is performed by the fixed device 202.

As discussed above, the processor 210 of the personal wireless communication device 201 monitors certain conditions 305, such as time, location, or a received instruction signal, in order to determine when to require the released individual to perform the check-in operation. When the processor 210 determines that a condition has been satisfied, the processor 210 generates a check-in notification to the user 310. The check-in notification is audible and/or visual.

After the check-on notification has been generated, the processor 210 starts a countdown timer 315. The processor 210 continues to monitor the countdown timer until it either expires, or until the user completes the check-in procedure 325. If the timer expires 325, then the processor 210 generates and sends a Check-In Fail message 335 to the check-in server 150.

Meanwhile, after the check-in notification has been generated, and while the countdown time is running, the user moves the personal wireless communication device 201 within close proximity of the fixed device 202. The personal wireless communication device 201 then sends a request signal 318 to the fixed device 202. The fixed device 202 receives the request signal 320. In some embodiments, the fixed device 202 also receives power from the personal wireless communication device 201. In response, the fixed device 202 retrieves the unique ID of the released individual from memory 330. The fixed device 340 then transmits the retrieved ID 340 back to the personal wireless communication device 201.

The personal wireless communication device 201 receives the ID 350, which causes the timer to stop 325. In other embodiments, the timer does not stop until check-in has succeeded, or after the countdown has expired. Following receipt of the ID, the processor may carry out additional processing 360. In various embodiments, such processing may include any one or more of decrypting the received ID, retrieving a locally-stored ID from memory, determining whether the received ID matches the locally-stored ID, receiving a location of the personal wireless communication device, etc. After all relevant information has been obtained, the processor 210 of the personal wireless communication device 201 generates and forwards a Check-In confirmation signal to the check-in server.

Using the above systems and methods, the released individual is able to use his/her own personal wireless communication device for check-in procedures. The above systems and methods ensure that the personal wireless communication is married to a fixed device. This ensures that the check-in procedure cannot be falsified, or attended to by an individual other than the specific released individual.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 5:
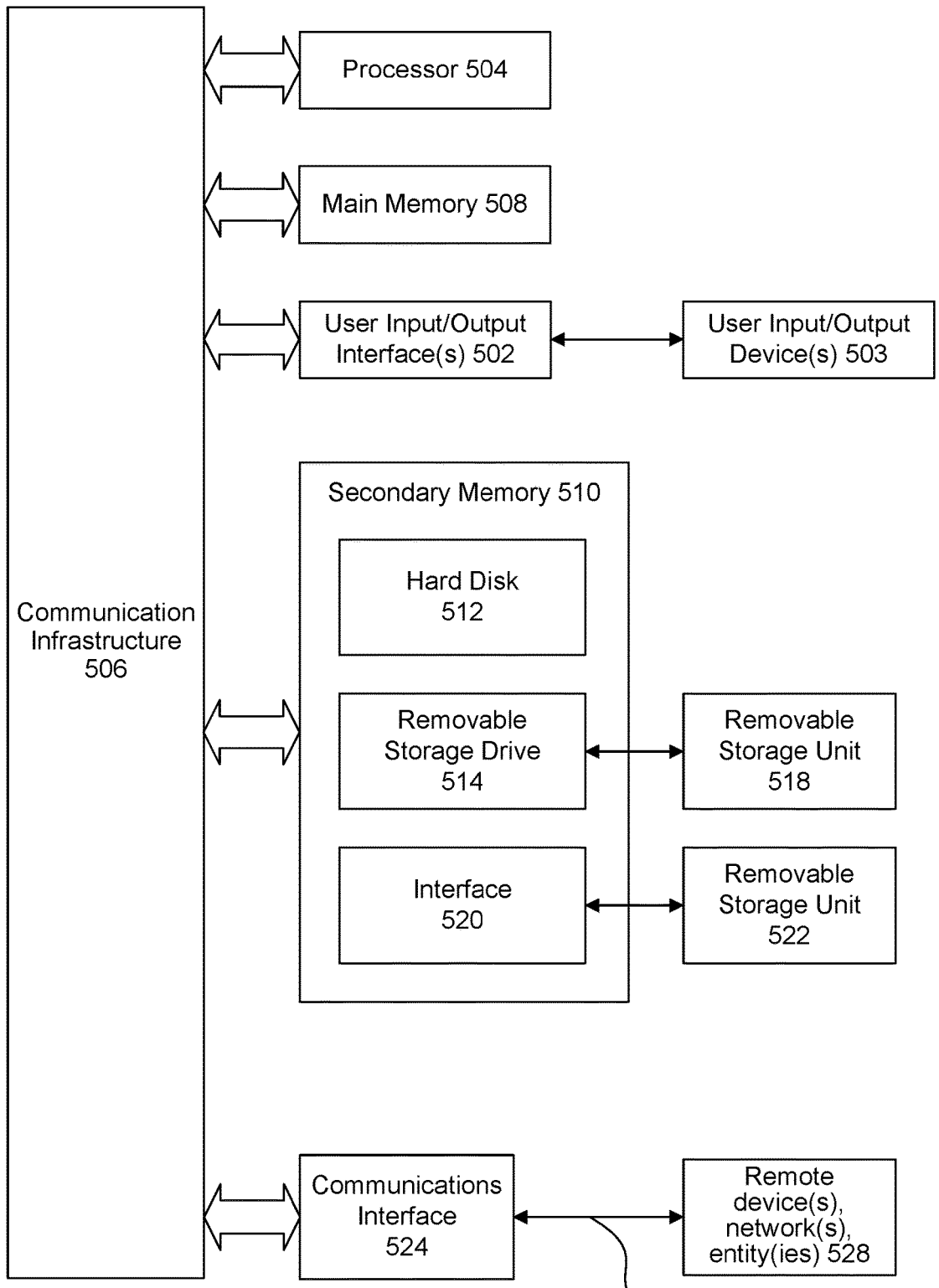
FIG. 5 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIG. 3 can be implemented in the environment of one or more computer systems or other processing systems. An example of such a computer system 500 is shown in FIG. 5. One or more of the modules depicted in the previous figures can be at least partially implemented on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, and the like. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A wireless communication device for monitoring an individual released from custody, comprising:
   a memory that stores identification information associated with the released individual and a plurality of parameters;
   a plurality of sensors configured to gather environment data;
   a transceiver configured to wirelessly transmit and receive signals with external devices; and
   one or more processors configured to:
      receive the environment data from the plurality of sensors;
      analyze the plurality of parameters based on the environment data;
      determine, based on the analyzing, whether a check-in procedure has been triggered; and
      initiate the check-in procedure in response to the determining, the check-in procedure including comparing received information to the stored identification information,
      wherein the initiating includes displaying a notification message that notifies a user of the wireless communication device that check-in is required.

2. The wireless communication device of claim 1, wherein the environment data includes a location of the wireless communication device.

3. The wireless communication device of claim 1, wherein the environment data includes an elapsed time.

4. The wireless communication device of claim 1, wherein the memory further stores permissible ranges of the environment data, and
   wherein the analyzing includes comparing the environment data to the permissible ranges.

5. The wireless communication device of claim 4, wherein the determining includes determining that the environment data falls outside of the permissible ranges.

6. The wireless communication device of claim 1, wherein the initiating further includes starting a countdown timer,
   wherein the notification message includes a display of the countdown timer.

7. The wireless communication device of claim 1, wherein the one or more processors are further configured to, in response to the initiating of the check-in procedure:
   receive personal identification information associated with the released individual via the transceiver;
   compare the received personal identification information to the stored identification information; and
   terminate the check-in procedure or issue an alert to a release enforcement officer based on the comparing.

8. The wireless communication device of claim 7, wherein the one or more processors are further configured to detect a corresponding personal device associated with the released individual during the check-in procedure.

9. A method for monitoring an individual released from custody using a wireless communication device, comprising:
- storing identification information associated with the released individual and a plurality of parameters;
- receiving environment data associated with an environment in which the wireless communication device is located;
- analyzing the plurality of parameters based on the environment data;
- determining, based on the analyzing, whether a check-in procedure has been triggered; and
- initiating the check-in procedure in response to the determining, the check-in procedure including comparing received information to the stored identification information,
- wherein the initiating includes displaying a notification message that notifies a user of the wireless communication device that check-in is required.

10. The method of claim 9, wherein the environment data includes a location of the wireless communication device.

11. The method of claim 9, wherein the environment data includes an elapsed time.

12. The method of claim 9, further comprising:
- storing permissible ranges of the environment data,
- wherein the analyzing includes comparing the environment data to the permissible ranges.

13. The method of claim 12, wherein the determining includes determining that the environment data falls outside of the permissible ranges.

14. The method of claim 9, wherein the initiating further includes starting a countdown timer,
- wherein the notification message includes a display of the countdown timer.

15. The method of claim 9, further comprising, in response to initiating of the check-in procedure:
- receiving personal identification information associated with the released individual via the transceiver;
- comparing the received personal identification information to the stored identification information; and
- terminating the check-in procedure or issuing an alert to a release enforcement officer based on the comparing.

16. The method of claim 15, further comprising detecting a corresponding personal device associated with the released individual during the check-in procedure.

* * * * *